United States Patent [19]

Cowgill

[11] Patent Number: 5,642,396
[45] Date of Patent: Jun. 24, 1997

[54] RELEASE CAUSE TABLE FOR FAILED CALLS IN SS7/ISDN NETWORKS

[75] Inventor: George A. Cowgill, Parker, Tex.

[73] Assignee: MCI Corporation, Washington, D.C.

[21] Appl. No.: 438,934

[22] Filed: May 10, 1995

[51] Int. Cl.⁶ .................. H04M 3/08; H04M 3/22; H04M 7/00; H04J 3/14
[52] U.S. Cl. .................. 379/14; 379/10; 379/221; 379/230; 370/16; 370/217; 370/236; 370/252
[58] Field of Search .................. 379/1, 9, 10, 11, 379/14, 15, 22, 32, 16, 220, 221, 229, 230; 370/13, 14, 16, 16.1, 17, 58.2

[56] References Cited

U.S. PATENT DOCUMENTS

| | | |
|---|---|---|
| 4,276,451 | 6/1981 | Beebe et al. . |
| 4,284,852 | 8/1981 | Szybicki et al. . |
| 4,686,701 | 8/1987 | Ahmad et al. . |
| 4,873,687 | 10/1989 | Breu . |
| 4,991,204 | 2/1991 | Yamamoto et al. ............. 379/221 |
| 5,182,744 | 1/1993 | Askew et al. . |
| 5,274,838 | 12/1993 | Childress et al. . |
| 5,319,632 | 6/1994 | Iwasaki . |
| 5,359,596 | 10/1994 | Sadiq . |
| 5,390,242 | 2/1995 | Bales et al. . |
| 5,488,648 | 1/1996 | Womble .......................... 379/1 |
| 5,546,450 | 8/1996 | Suthard et al. .................. 379/10 |
| 5,568,475 | 10/1996 | Doshi et al. .................... 379/230 |

Primary Examiner—Curtis Kuntz
Assistant Examiner—Paul Loomis

[57] ABSTRACT

A plurality of release action tables are maintained in the switching nodes of a telecommunication network, e.g SS7, ISDN, one table for each trunk group. The table indicates desired actions or treatments to be taken for failed calls, each identified by a cause condition. Upon receiving a cause condition expressed as a code at a switching node, a release action table index is accessed to identify the release action table for the trunk group experiencing the cause condition. The cause code is compared against entries in the release action table by a control program included in the switching node. Based upon such comparison, the table indicates to the network the corrective action to be taken to remedy the failed call condition. Changes to the network for failed call conditions are accomplished by altering the data in the release action table rather than changing network.

5 Claims, 7 Drawing Sheets

Categories of Location Codes

| CODING | DESCRIPTION | CATEGORY |
|---|---|---|
| 1010<br>0011<br>0110 | Unknown<br>Transit<br>Local Interface Controlled by this Link | Transit Group |
| 0100<br>0010 | Remote Local Public Network<br>Local Local Public Network | Telco Group |
| 0111 | International Network | International Group |
| 0101<br>0001<br>0000 | Remote Private Network<br>Local Private Network<br>User | User Group |

FIG. 3

FIG. 5A
Table Datafill — Call Processing Examples

Example #1 Table Datafill For Switch "A"

| Origination | Bear | Cod.ST | Loaction | Cause | Retry | Action | Log |
|---|---|---|---|---|---|---|---|
| PTS | --- | STAND. | Telco | 17 | N | Local TR03 | N |

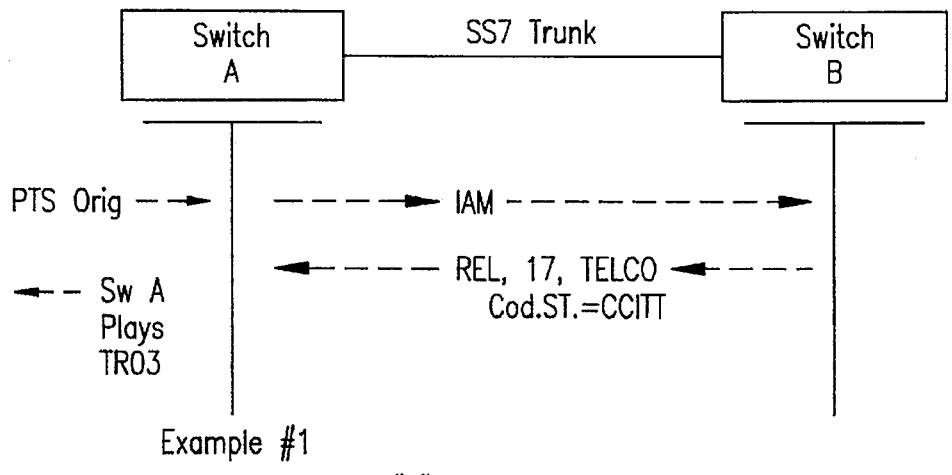

Example #1

Switch "A" Provides Treatment TR03

FIG. 5B

Example #2 Table datafill for Switch "A"

| Origination | Bear | Cod.ST | Loaction | Cause | Retry | Action | Log |
|---|---|---|---|---|---|---|---|
| ISUPA | DIG | STAND. | USER | 17 | N | RWC,17,StMP | N |

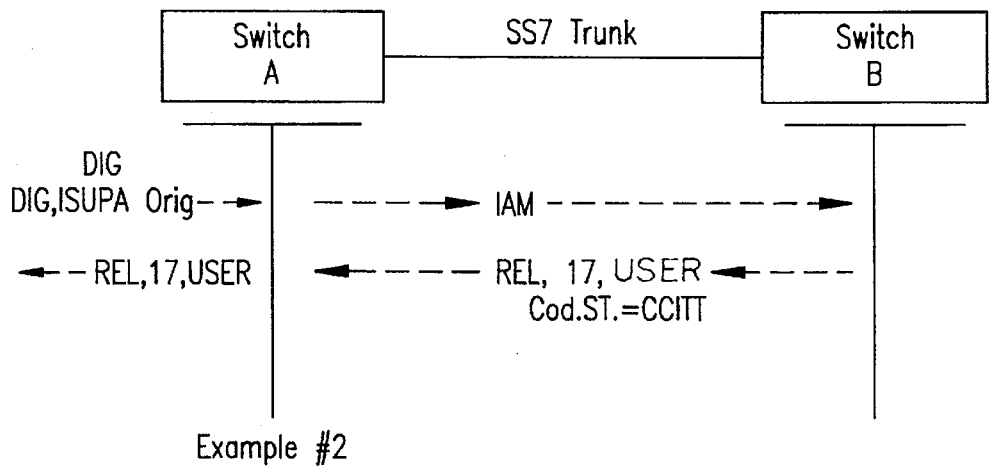

Example #2

Switch "A" sends a REL, the Location is "St.Map", As received, unless mapping per appendix E is required.

Example #3   Table datafill for Switch "A"

| Origination | Bear | Cod.ST | Loaction | Cause | Retry | Action | Log |
|---|---|---|---|---|---|---|---|
| ISUPN | DIG | STAND. | TRANS | 31 | N | RWC,31,StMP | Y |

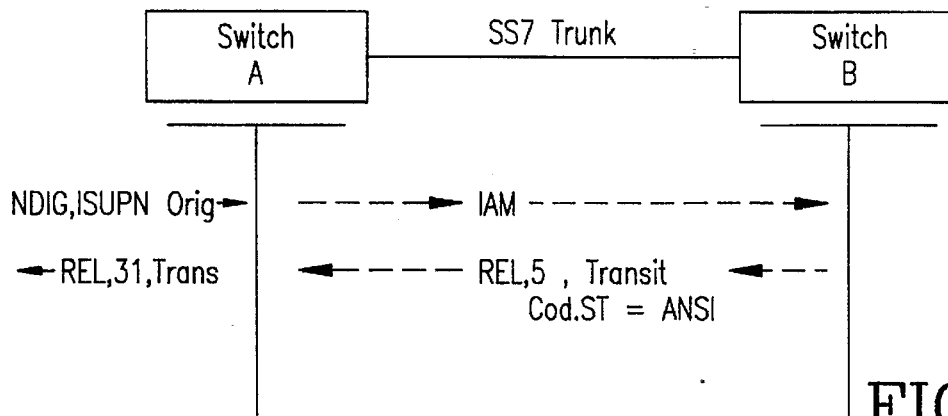

FIG. 5C

Example #3

Switch "A" Receives Cause 5, sends a REL Cause 31. The switch sends cause 31 because Cause 5 is not found and 31 is the default for Cause Class 000. The Location is "St.MP", as received, unless mapping per appendix E is required.

Example #4   Table datafill for Switch "A"

| Origination | Bear | Cod.ST | Loaction | Cause | Retry | Action | Log |
|---|---|---|---|---|---|---|---|
| ISUPN | NDIG | STAND. | Telco | 31 | N | RWC,ASIS,StMP | Y |

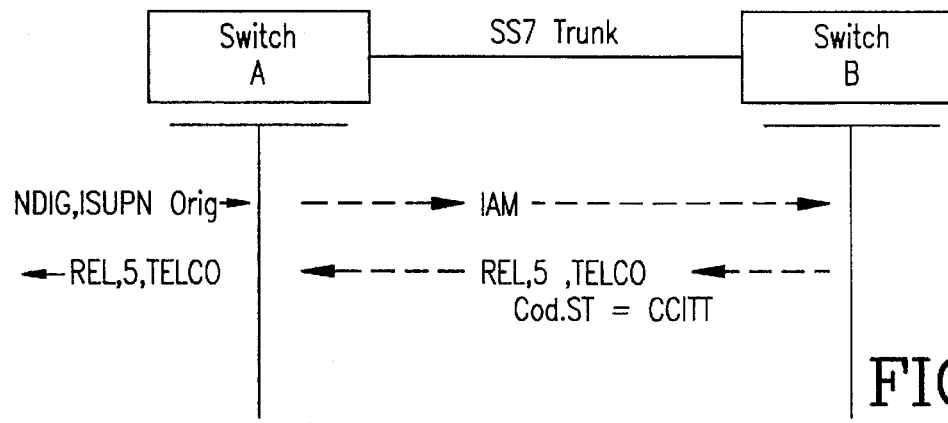

FIG. 5D

Example #4

Switch "A" Receives Cause 5, sends a REL Cause 5. The switch sends Cause 5, as received, even though 5 is not found and the default for Cause Class 000 (31) is used. This is becuase the action is RWC, ASIS, StMP. The location is sent as received unless mapping per Appendix E is required.

Example #5  Table datafill for Switch "A"

| Origination | Bear | Cod.ST | Loaction | Cause | Retry | Action | Log |
|---|---|---|---|---|---|---|---|
| ISUPA | NDIG | NET | USER | 47 | D | RWC,ASIS,StMP | N |

Table datafill for Switch "B"

| Origination | Bear | Cod.ST | Loaction | Cause | Retry | Action | Log |
|---|---|---|---|---|---|---|---|
| ISUPA | NDIG | NET | USER | 47 | N | RWC,ASIS,StMP | N |

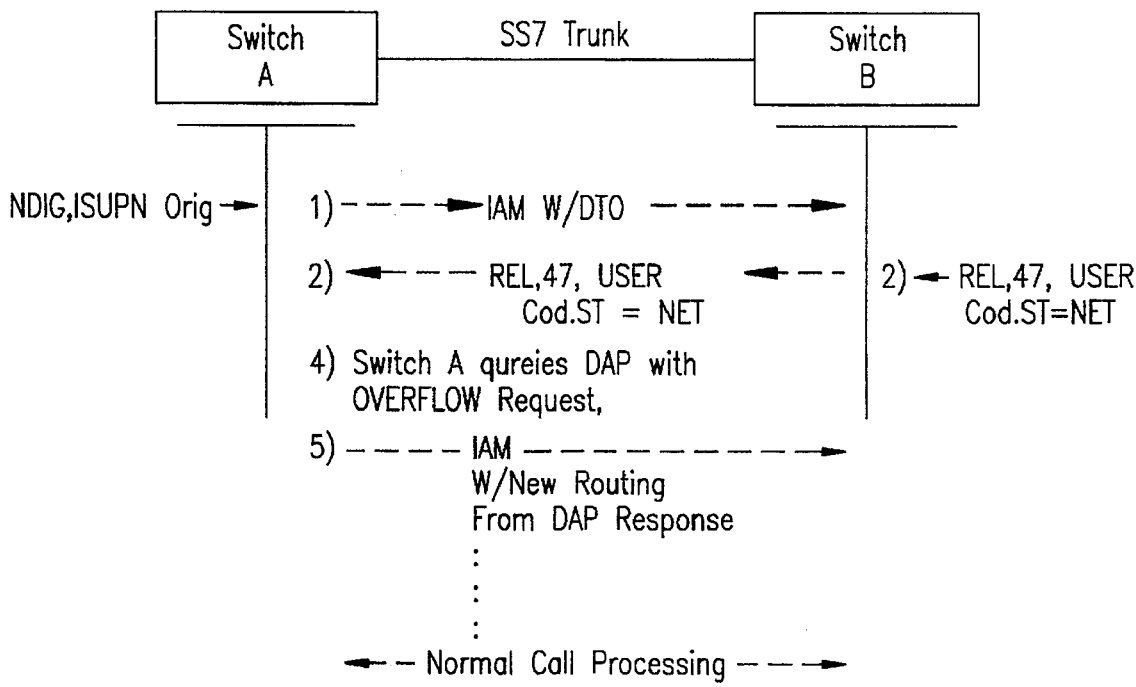

Example #5 - CPE Intiated Direct Termination Overflow

1) Switch "A" receives a call, routes call via DAP, DAP response indicates DTO is available. Switch "A" Launches 1st IAM with MFCSI set to DTO allowed.
2) Switch "B" routes call to term. Trunk Group, Receives RWC 47, Coding St. = Net. Specific.
3) Switch "B" accesses Action Table, determines Action of RWC, ASIS, ASIS.
4) Switch "A" receives Switch "B" RWC, Queries DAP with overflow routing request because Table Datafill for Retry/Redirect= "D" (DAP).
5) Switch "A" launches 2nd IAM based on DAP overflow routing Response.

FIG. 5E

RELEASE CAUSE TABLE FOR FAILED CALLS IN SS7/ISDN NETWORKS

BACKGROUND OF THE INVENTION

1. Field of the Invention

This invention relates to telecommunications networks. More particularly, the invention relates to malfunction treatments on SS7/ISDN networks for failed calls.

2. Description of Prior Art

In telecommunications networks, calls are established from source to destination, in the form of links traversing a series of switching nodes. Under normal circumstances, when the calls are terminated the links between each switching node are released in order to allow other calls to use those links. Sometimes during the process of establishing the links between the nodes, abnormal conditions are encountered which interfere with the normal creation of links from source to destination. At such times, some of the links have been established, but others of the links have not yet been established. It is then necessary to decide whether to continue establishing the remaining links, or to release all links that have so far been created and thereby completely terminate the call. Typical abnormal conditions that may be encountered are ALL TRUNKS BUSY, USER BUSY, DESTINATION OUT OF SERVICE, NETWORK OUT OF ORDER, CALL REJECTED, INFORMATION MISSING, and so forth.

The existence of normal and abnormal conditions is indicated in the telecommunication network by digital code numbers ("cause codes") that may be propagated backward along the existing links to the source or sent to centralized billing or network diagnostic stations. Often, the telecommunication network comprises a variety of vendors each generating a variety of cause codes to indicate the same conditions. It is necessary to translate the cause codes of one vendor to the codes of another vendor in order to ensure proper communication between the switching nodes.

Prior methods for managing the diversity of cause codes that may be present in the telecommunication network and for deciding which action to take upon appearance of a particular cause code have been based on hard-encoded computer programs that are difficult to create or modify when the codes change or new codes need to be added or new vendors come on-line.

The prior art related to the problems solved by the present invention include the following:

U.S. Pat. No. 5,390,242 issued Feb. 14, 1995 discloses a protocol message which is a redirect message in a telecommunications system having a number of switching nodes. The redirect message redirects a call back to a switching nodes and indicates in that message to which the switching node the call pass should be extended. In response to the redirect message, the intermediate switching node reroutes the call path. The redirect message may also entirely remove the call path between the switching node and an intermediate switching node.

In U.S. Pat. No. 4,873,687 issued Oct. 10, 1989, a method and apparatus detect and analyze errors in a communications system. The method employs an expert system techniques to isolate failures to a specific field replaceable units and attempts to restore the failing unit to service by removing it from service, resetting the resource and returning it to service if it passes retesting.

U.S. Pat. No. 4,991,204, issued Feb. 5, 1991, discloses a telecommunication network in which a switching node assigns one or more alternate routes in advance for a call. The switching node responds to a call connection request to try to connect the call to the first route, and when having failed at a call connection, the switching node retrys the call connection through one of the assigned routes.

U.S. Pat. No. 4,284,852 issued Aug. 18, 1981, discloses a alternate routing scheme for telephone system wherein a plurality of switching offices are grouped into a cluster, with each switching office in the cluster having direct trunks lines to all of the other switching offices in the cluster. Suitable equipment monitors the busy status of all the switching offices in the cluster and determines a most likely alternate routing scheme for switching office. The alternate routing scheme for each particular switching office is stored at that particular office and is periodically updated, by suitable equipment, so as to account for changes in the busy status of the other switching offices and trunk lines in the cluster.

U.S. Pat. No. 5,182,744 issued Jan. 26, 1993 discloses a restoration system for enhancing the reliability of a telecommunication network such that particular traffic which is disrupted by, for example, a faulty link, may be quickly rerouted by an alternate route established "on the fly". Each node and link forming the network is monitored, and in the event of such monitoring, detects a faulty link or node then, then a central controller is notified. The controller is arranged to locate spare capacity and establish an alternate route, in which the continuity of the alternate route is confirmed before the disruptive traffic is transferred.

U.S. Pat. No. 5,319,632 issued Jun. 7, 1994, discloses a unit specifying circuit which specifies a first and second specified unit in a cross-connect systems in accordance with a particular route which is selected as a path. When a failure occurs in a particular point of that path, the first specified unit executes a pre-determined operation in cooperation with a second specified unit. When the pre-determined operation finishes, each of the cross-connect systems is operable to select, as the path, another one of the communications route. A failure in the system is detected in accordance with a path alarm indication signal which is supplied from the particular point to each of the first and second specified unit.

None of the prior art addresses various processing scenarios which will activate an action table for release or disconnect of a call with a cause message received over a terminating SS7 or ISDN trunk unit without recoding a control program. Nor does the prior art address the problem of an interchange carrier determining which network and switch should apply a treatment and announcement for a failed call on an SS7 or ISDN network.

SUMMARY OF THE INVENTION

An object of the invention is a system and an improved method for managing a variety of cause codes present in a telecommunication network, including translating the codes from the language of one vendor into the language of another vendor, and for automatically performing selected actions in response to the cause codes.

Another object is a system and method for rapid implementation and modification of code translations and desired actions in response to changing network requirements, without necessitating complicated recoding of control programs.

Another object is a system and method for initiation actions to be determined on a per trunk group basis, and in partial dependence upon whether or not the event was locally or remotely initiated.

These and other objects of the present invention are accomplished by maintaining in an SS/7 or ISDN system a plurality of RELEASE ACTION TABLES (RATs), one for each trunk group, indicating each possible cause code corresponding to the trunk group and the desired actions to be taken as a result of the cause code. Upon receiving an event generating a cause code from a specified trunk group, a TRUNK GROUP TABLE (TGT) is used to locate a corresponding RELEASE ACTION TABLE INDEX (RATI) that points to the designated RAT corresponding to that trunk group. The cause code is compared against the entries in the RAT to find the particular record or records that match that cause code. On the basis of the data contained in that record or those records, and upon possible other conditions, a fixed computer program determines additional actions to be taken. Changes to the actions to be performed are accomplished by altering the data in the RATs rather than changing the fixed computer program.

BRIEF DESCRIPTION OF THE DRAWINGS

FIG. 3 is a table of location Codes Categories for a Release Action Table.

FIGS. 5A–5E are representations of call processing examples for various cause codes in implementing the principles of the present invention.

DESCRIPTION OF THE PREFERRED EMBODIMENT

Figure 1:
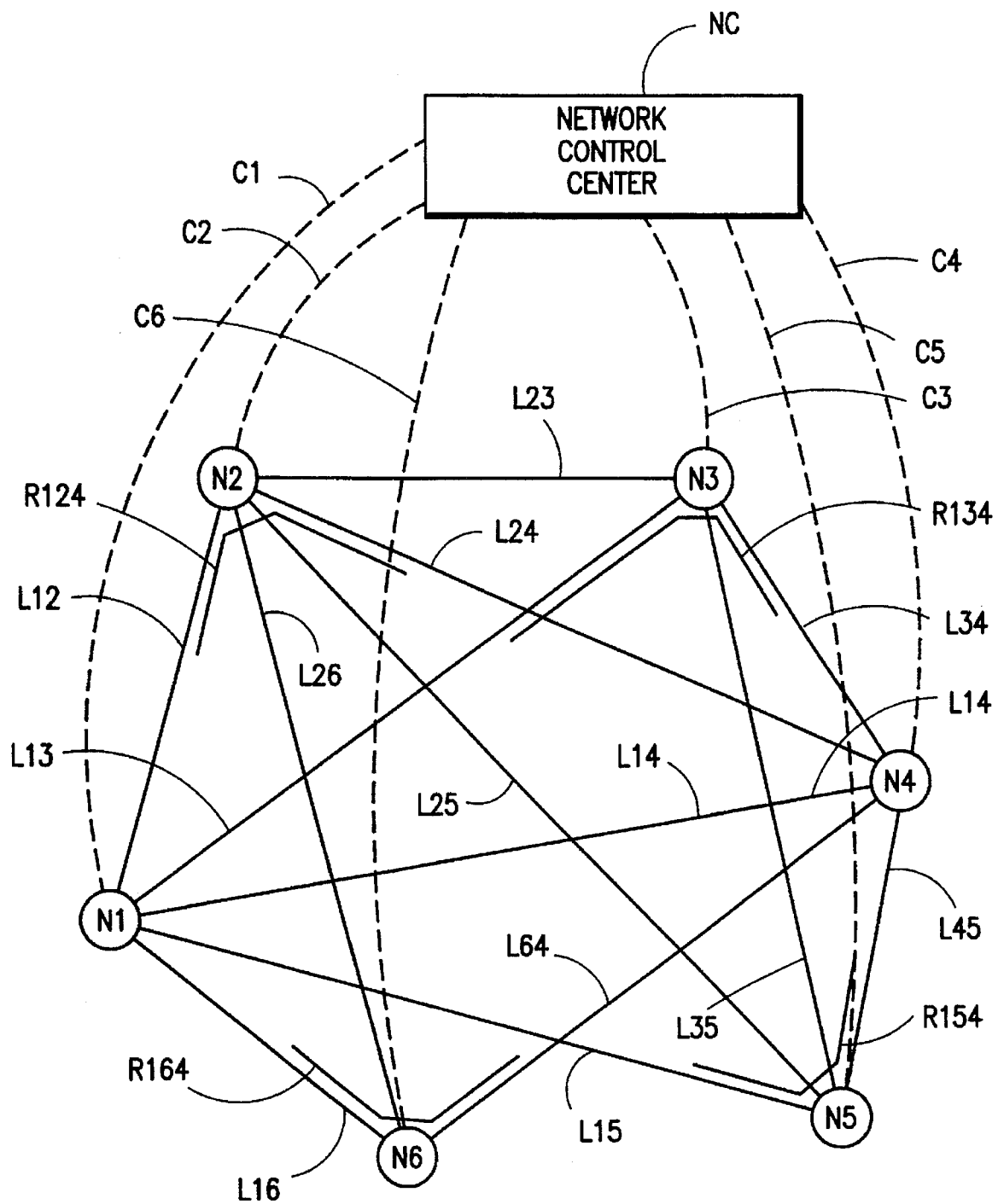
FIG. 1 is a representation of a typical prior art SS/7 or ISDN network comprising a plurality of switching nodes, communication links, and central control facilities to which the invention is applicable.

FIG. 1 shows a typical prior art telecommunications network including a plurality of switching nodes N1–N6 interconnected through a plurality of links L12–L56 to form various call routes thereamong. Under normal circumstances, a call to be placed from node N2 to node N4, for example, might be effected by capturing the sequence of links L25, L35, and L34, with the particular choice of links depending upon the availability of trunks between the switching nodes. Under abnormal circumstances, however, it may happen that links L25 and L53 are available, but link L34 is not. Therefore, node N3 will issue a cause code indicating a failure to establish link L34. The cause code may be embodied in a message and travel back along the sequence of nodes N3 and N5 to the originating source (N2). Alternatively, the cause code may be transmitted to a central network control center NC for billing or diagnostic purposes. Node N3 may be internally programmed or may be externally commanded (e.g., by NC) to try to re-establish the link L34, or perhaps to pass back a RELEASE signal (REL) along links L35 and L25 and give up the attempt to establish the call from N2 to N4. Node N5, upon receiving REL, may release the call and pass back a further REL signal to node N2, or may try to establish the same link L35 or a different link such as L45. The choice of which action to take at nodes N5 and N3 will depend upon the particular programming of these nodes. In prior telecommunications networks, the choice of action was hard-encoded in the programming of the nodes, and in some cases, the node might receive a cause code for which it was unable to determine a course of action.

The present invention describes a RELEASE cause action table shown in Table 1 which is installed in conjunction with a control program capable of implementing malfunction treatments at switching nodes $N1_x$ where x is any integer. In response to a cause code (Table 2, described hereinafter), the present invention, initiates action in response to these codes. A fixed computer program searches this table to find a match. A typical RAT is shown below:

TABLE 1

Typical Release Action Table (RAT)

| Origination | Bearer | Cod. ST | Location | Cause | Retry | Action | Log |
|---|---|---|---|---|---|---|---|
| PTS | | STAND. | Telco | 31 | N | Local, TR03 | N |
| ISUPN | NDIG | STAND. | INT'L | 41 | R | RWC, ASIS, StMP | N |
| ISUPA | DIG | STAND. | Telco | 34 | N | RWC, ASIS, StMP | N |
| . | . | . | . | . | . | . | . |
| . | . | . | . | . | . | . | . |
| . | . | . | . | . | . | . | . |
| ISUPN | NDIG | NET | USER | 17 | D | RWC, ASIS, StMP | N |
| ISUPN | NDIG | STAND. | Telco | 31 | N | RWC, ASIS, StMP | Y |

There are ten (10) possible entries which must be included in the Release Action Table (RAT), as follows:

a) Origination Type PTS, ISUPA, ISUPN b) Bearer Capability Digital, Non-Digital c) Coding Standard Code Stand of Cause Indicator d) Location of REL Location Value e) Cause Value Cause Value or Internal Switch Event f) Retry Field Retry, Data Access Point (DAP)

g) Action, Local REL Treatment to provide Cause Code (optional, datafill) Location of Cause Code propagated (optional, datafill)

h) log Indication Optional, Datafill

Entries a, b and d may not be changed or deleted. The Cause Values designated as defaults may not be changed or deleted. All other entries for cause values may be changed.

The table, when accessed, enables the node to take various actions on a failed call occurring in the SS7/ISDN environment on a per trunk basis. The Table driven flexibility is applicable to calls which failed internal to the switch or failed in other terminating switches. The Table will allow for man machine interfaceable actions to be taken on calls which fail during the following call scenarios:

(a) Call Failure Within a Switch:

(b) REL Message Received from an SS7 Integrated Services Digital Network User Part (ISUP) termination;

(c) REL Message Received from an ISDN Primary Rate Interface (PRI) termination;

The action table will be active on any originating trunk group including:

(a) Any SS7 ISUP trunk group;

(b) Any ISDN trunk group; and (c) Any per-trunk signalling (PTS) for inband trunk group people.

There are two call processing scenarios which will activate the action table upon a call failure, which is defined as follows:

(a) RELease or DISConnect with cause message received over a terminating SS7 or ISDN trunk group.

The REL/DISC with cause message is defined as any Cause Value other than Normal clearing or normal termination of a call. A RELease with cause message can be received before or after an address complete message (ACM) on SS7 termination. An ISDN RELease or DISConnect message may be received before or after an ISDN ALERTING message.

If a REL/DISC message is received after an ANSwer (SS7) or CONect (ISDN) message is received, the call will be treated as if a normal call clearing message was received and the action table would not be activated.

An action will also need to be taken on cause value for normal clearing if the cause value is received before ACM or an answer (ANM) (if no ACM is sent) messages. This cause value is specified in Table 2, but would only be valid if received before ACM pr ANM (if no ACM is sent).

(b) Internal call failures are defined as calls which cannot be terminated due to routing, screening, resource, switch degradation or database problems within a given switch or node. Examples include ALL Trunks busy, lack of system resources, database screening failures, etc.

Figure 2:
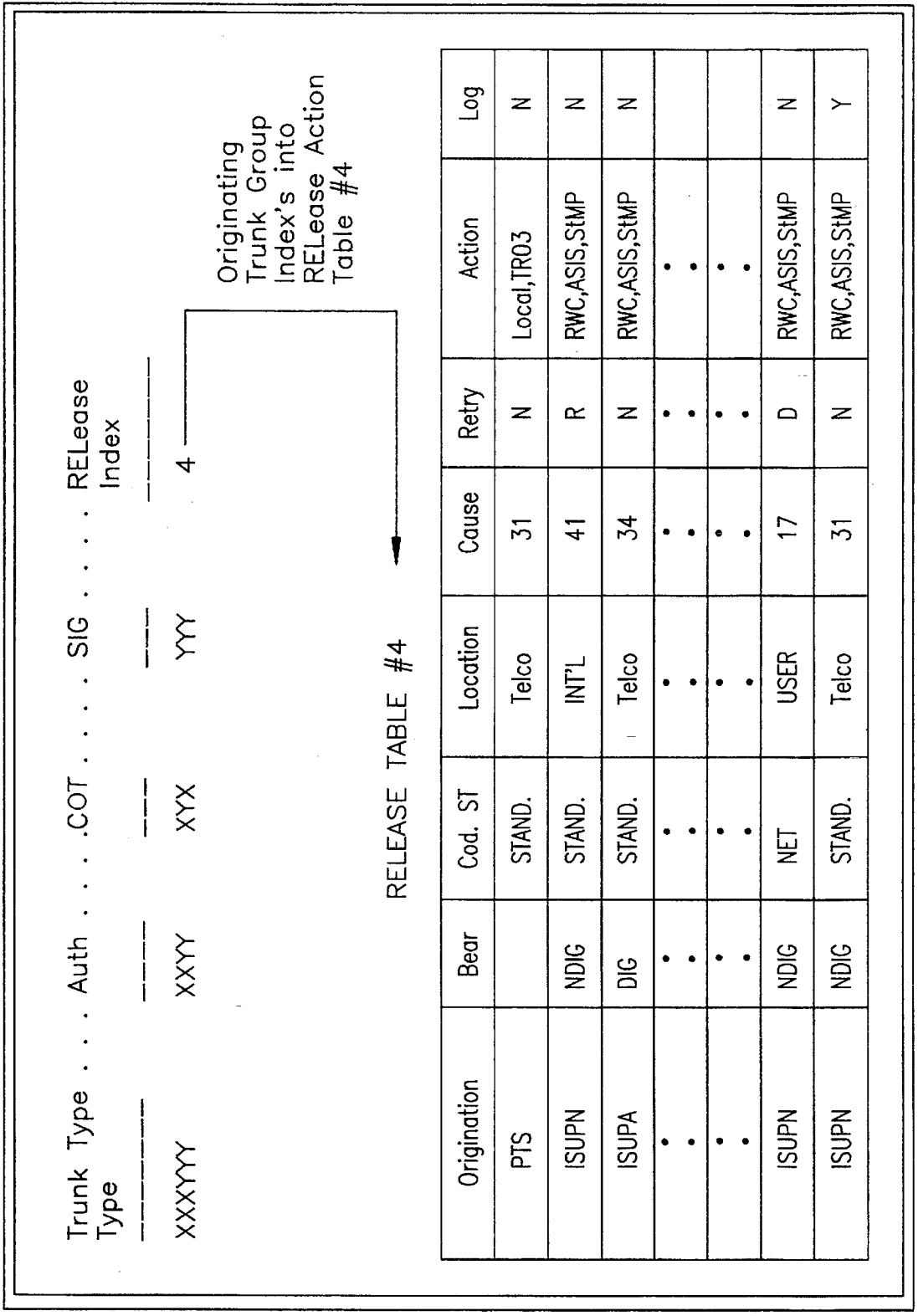
FIG. 2 is a Release Table Index For A Trunk Group.

There may be multiple RATs, each associated with a different trunk group. In that case, a TGT (TRUNK GROUP TABLE) is used to obtain a RAT index associated with that trunk group, and the RAT corresponding to that RAT index is then used in processing the incoming event. A Release Table Index (Index) is shown in FIG. 2 and determines what action to be taken on any calls which originate on that specific trunk group Specific "action profiles" are required for different originating trunk groups. The REL table index will have a range from 1–32. This will allow the creation of 32 different REL/treatment profiles on a single switch. The Index does not have any effect on calls which terminate over a given trunk group.

While the response to these codes might be carried out in the prior art at a switching nod by a computer program containing a chain of compare instructions between the incoming cause code and each of the above codes.

Summarizing Table 1, the Origination field indicates whether the call originates in PER TRUNK SIGNALING (PTS), or ISDN USER PART (ISUP), either used all the way (ISUPA) or not used all the way (ISUPN). The ISUP is obtained from the SS7 INITIAL ADDRESS MESSAGE (IAM). If the call originates on a ISDN trunk, the default value sign during the call set-up will be ISDN USED all the way. If the call origination is PTS, the action of sending a release with cause in a backward direction will not be allowed. All calls which allow reorigination (card calls, etc.) are handled as if they are PTS calls. Origination type will be defaulted to PTS for these calls.

The Bearer Capability indicates whether the entry is required to identify the call as a switched DDS digital (DIG) or voice (NDIG) call, as obtained from the IAM, and is not required for PTS calls. The classification of digital/non-digital will be based on the coding of the user service information parameter of the originating initial address message. In the case of an ISDN origination, this classification will be based on the bearer capability information element of the set up message.

The Coding Standard is received in the REL/DISConnect Message over SS7 and ISDN trunks. The Coding Standard formulated during call failures within the switch may be based on ANSI T1.113.2 Issue 2 and ANTSI T1,607(1990).

Location values received over SS7,ISDN trunks are assigned for different categories of users as shown in FIG. 3. Location values formulated within the switch for call failures within the switch are mapped to a Location value and Cause value. Each switch in the network, regardless of carrier, has a call failure to RELease cause, location code mapping document.

Cause codes are shown in Table 2. A typical list of cause codes that might be expected to be found at a telecommunications switching node, are as follows:

| Code | | Name |
| --- | --- | --- |
| 2 | | No Route to Transit Net. |
| 3 | | No Route/Destination. |
| 4 | | Send Special Tone. |
| 16 | * | Normal Clearing -- normal termination of call. |
| 17 | | User Busy. |
| 18 | | No User Response. |
| 21 | | Call Rejected |
| 22 | | Number Changed. |
| 27 | | Destination Out of Service. |
| 28 | | Incomplete Address. |
| 31 | * | Normal, Unspecified. |
| 34 | | No Circuit Available. |
| 38 | | Network Out of Order. |
| 41 | | Temporary Failure. |
| 42 | | Switch Congestion. |
| 43 | | User Information Discard. |
| 44 | | Requested Channel Unavailable. |
| 47 | * | Resource Unavailable. |
| 48 | | Quality of Service Unavailable. |
| 58 | | Bearer Cap Unavailable. |
| 63 | * | Service or Option Unavailable. |
| 79 | * | Service or Option Not Implemented. |
| 88 | | Incompatible Destination. |
| 95 | * | Invalid Message. |
| 97 | | Message Type Not Existent. |
| 99 | | Parameter Not Existent |
| 100 | | Invalid Parameter Content. |
| 111 | * | Protocol Error. |
| 127 | * | Interworking. |

The cause codes indicated with an asterisk (*) represent the basic set of codes, with additional entries representing optional codes implemented by some vendors.

The cause code values are divided into classes as specified in ANSI T-113.2 Issue 2. Not all cause values are explicitly specified in Table 2. The default for each cause class must be explicitly specified in the Table. In addition to the default cause value, 30 additional entries for category combination must be available. These 30 entries are data filled and must be man-machine interface able. If a cause value is received and its not identified in the table, the default for the class should be used along with other conditions to determine the action required.

In addition to the cause values which would be received over an SS7 or ISDN trunk, call failures which occur within switch must be mapped to a cause value and a location value. Each switch must supply a call failure to REL code mapping document. For example, an all trunks busy condition occurring within the switch in question would be mapped to a cause code 34. After formulating a cause and location according to this event, the required switch action will be determined by a Release Action Table.

The Retry field indicates whether the call should be re-attempted on the next available route or redirected based on a routing response. As explained below, it is not always advisable to automatically retry the link, and therefore the node maintains a Retry Counter to ensure that the link is only retried a specified maximum number of times. This field may also indicate that No re-attempts or redirection should occur. There are several options for the retry field. Among these options are:

(a) Retry—If this field is set to retry, the call will be re-attempted on the next available route choice.

(b) Data Excess Point (DAP)—If this field is set to DAP and direct termination overflow (DTO) is allowed for the call in progress, a standard application data field (ADF) transactional capabilities part (TCAP) overflow treatment request message will be sent to DAP and the call will be redirected based on the DAP response.

(c) DAP Plus Retry—If, this field is set to data and retry (D&R), both DAP and Retry have been selected. The order of precedence is DAP for calls where DTO is available, REtry on calls which do not have DTO available.

(d) None—If this field is set to "N" or none, then no retry or DTO, actions will be taken. The action for this call will be determined by the Action field entry.

The Action field determines the actions taken when a call or call event matching the previous conditions has occurred. The field indicates the types of messages that are propagated back through the network as a result of the call event. The options for this field are:

(a) RWC (Release With Cause) indicates to propagate a REL message in the backward direction for this call. In this case, the cause code is filled in by the current node. ASIS indicates that the cause code can be propagated AS IS; and (b) Treat Locally indicates that the event is handled locally, with the REL message propagated backward with the cause coded as "normal clearing."

The Log indicator field generate a log entry for each specified call failure for diagnostic purposes.

Figure 4:
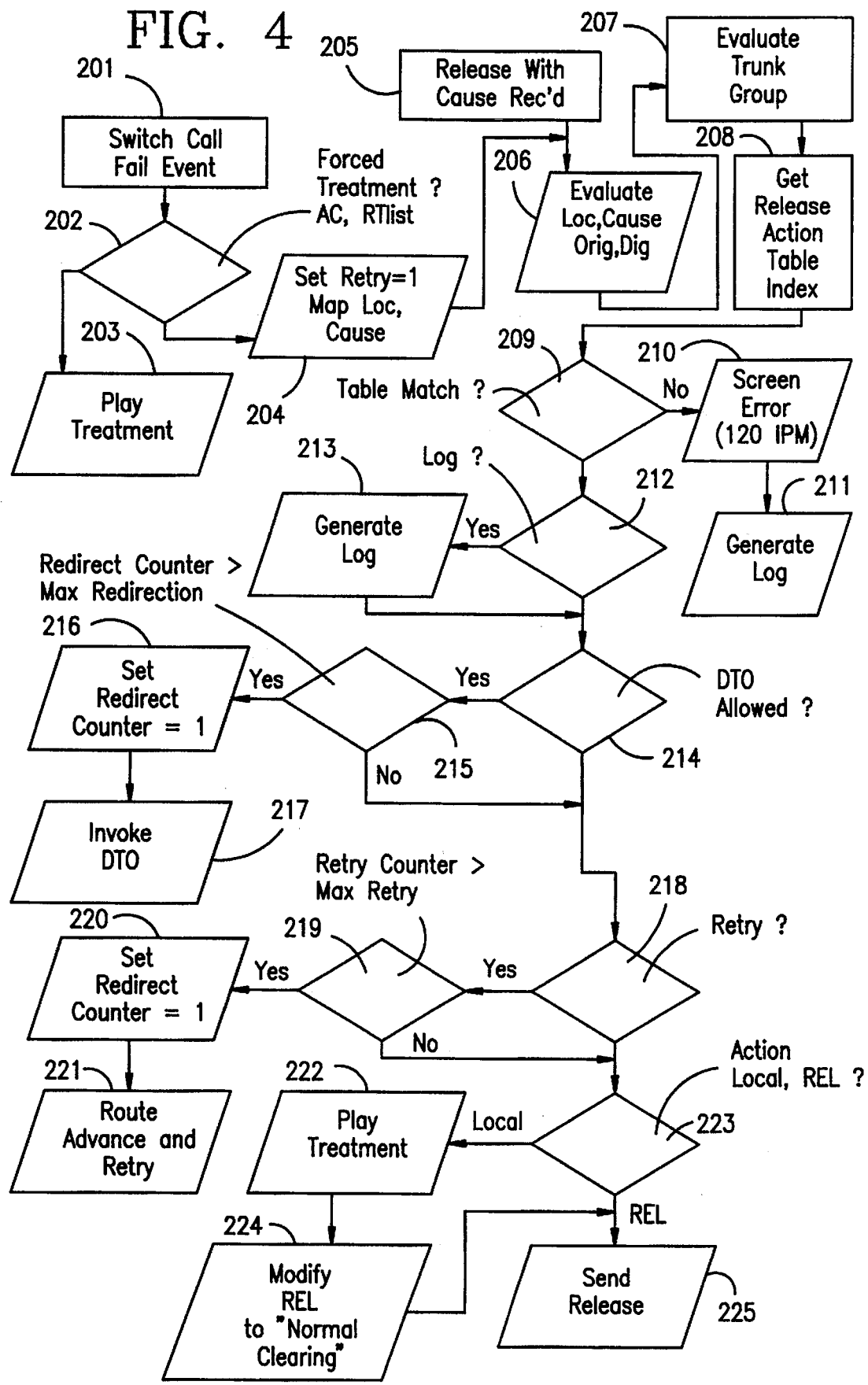
FIG. 4 is a flow chart for a control program incorporating the principles of the present invention in performing a desired action based upon data contained in a Release Action Table (Table 2).

Now turning to the operation of the Release Action Table (Table 1), a preferred embodiment may be illustrated in conjunction with the flow diagram of FIG. 4. An event requiring use of the RAT may be generated at the current switching node 201 or may be the result of a REL propagating through the network 205. If the event is locally generated, it may be treated locally as in box 203. Or, the event may be externally generated or treated, in which case the program first determines the location, cause, origin and type of signal (digital or non-digital) in flow box 206; then determines the trunk group and obtains the pointer to the appropriate RAT in flow boxes 207 and 208, and looks up the event conditions in that RAT to determine whether or not the RAT includes the necessary action data for that event (box 209). In the case the RAT contains appropriate information for that event, the program continues to invoke the appropriate actions as dictated in the Log, Retry, and Action fields of the table. First, a log entry is generated if so required in the Log field (box 213). Then if redirection is indicated by a "D" in the Retry field, the Redirection Counter is checked to see if too many redirection attempts have been performed (box 215), and if not, the redirection is performed in box 217 (Direct Termination Overflow). If "R" or retry is indicated in the Retry field, then the Retry Counter is checked to see if too many retry attempts have been performed (box 219), and if not, retry is performed in box 221. Finally the Action field is queried to determine if the action should be locally treated, released with cause, or passed back ASIS. If local treatment is specified, then the event is locally treated in box 222, and the Release message is changed to "normal clearing." Otherwise, the event is either released with cause or passed back ASIS, as indicated in box 225.

As described above, by removing the action data from the control program and placing it in a Release Action Table, it is possible to utilize a fixed computer program and yet have a changeable control algorithm. In addition, the use of the RAT enables a wide variety of actions dependent upon event conditions to be efficiently implemented and presented.

Now turning to FIGS. 5A–5E, various examples of call processing will be described in state diagrams for the switches involved in processing various cause code conditions, as follows:

In FIG. 5A, a Release Action Table Data Fill is shown for a PTS originated signal at switch A. An initial address message is sent to switch B which responds to a User Busy condition (Code 17) by returning a release message to switch A which initiates and plays a local TRO3 announcement.

In FIG. 5B, a Release Action Table is shown for an integrated services digital network user part (ISUP) message applied to Switch A. An initial address message is sent to Switch B which returns busy signal to Switch A which generates a REl message to a user.

In FIG. 5C, a Release Action Table is shown for an ISUP an originated signal which indicates a cause 5 failure. Switch A sends a cause 31 failure to Switch B since cause 5 is not found in Table 2. Cause code 31 is the default for the cause code. Switch B sends a release message to Switch A which returns a REL to the location Transit.

In FIG. 5D, a Release Action Table is shown for an ISUPN originated signal to Switch A for a cause 5 condition. Switch A sends a REL cause 5 to the Telco even though cause 5 is not found in the cause table for Switch A. This because the action is a release with cause (RWC) condition. Switch B returns to Switch A a REL to the Telco for cause 5.

In FIG. 5E, the Release Action Table shows Switch A receiving a NDIG call and routing the call via a digital access point (DAP) which indicates direct termination overflow is available. Switch A launches a first initial address message with the MFCFI set to direct termination overflow. Switch B routes the call to the terminal trunk group, receives an RWC 47. Switch B accesses the Action Table, determines the for RWC. Switch A receives Switch B RWC, queries DAP with overflow routing request because table datafill for Retry/Redirects=DAP. Switch A launches a 2nd IAM based on DAP overflow routing response.

While the use of the RAT has been illustrated on the basis of a specific table structure and control program, it should be clear that modifications to the table and program can be carried out by those skilled in the art without departing from the novel aspects of the invention. The scope of the invention should therefore be determined by the claims appended herewith.

What is claimed:

1. In a telecommunications network including a plurality of switching nodes, a plurality of communication links, and a central control/diagnostic facility wherein said network includes means to propagate information backward along a call path in response to a network event, an improved method for processing failed calls at a switching node in response to network events comprising:

placing at said switching node at least one Release Action Table and a control program capable of utilizing said Release Action Table, wherein said Release Action Table indicates the appropriate action to be performed at said switching node as a result of a network event;

obtaining cause information at said switching node relating to said network event;

using said control program to compare said cause information against entries in said Release Action Table to locate a match;

reading from said Release Action Table corresponding action information relating to the appropriate action to take at said switching node in response to said network event; and performing the action specified by said action information.

2. The method for processing failed calls of claim 1 further comprising the step of generating a cause code to propagate backward along the call path, wherein said cause code is based jointly upon the information contained in said Release Action Table and said cause information corresponding to said network event.

3. In a telecommunication network including a network control center, a plurality of interconnected switching nodes, each node having control programs, a system for managing failed call causes and automatically performing selected actions in response said failed cause condition, comprising:

a) a release action table installed in at least one switching node for at least one trunk group;

b) a release table index (Index) installed in at least one switching node for at least one trunk group;

c) means for obtaining cause conditions for failed calls on the network;

d) means for comparing said cause condition against entries in the release action table for a trunk group identified by the Index; and e) means for correcting the cause condition based on an action specified in the release action table identified by the Index.

4. The system of claim 3 wherein the switching node experiencing a cause condition takes corrective action on a failed call occurring on an SS7 or ISDN network.

5. The system of claim 3 wherein the release action table enables the system to translate automatically cause conditions for one switching node to a different switching node for corrective action on the network.

* * * * *